(12) United States Patent
Wang

(10) Patent No.: US 11,596,277 B2
(45) Date of Patent: Mar. 7, 2023

(54) WET WIPE COVER WITH CONVENIENT WIPE DRAWING OPENING

(71) Applicant: Top Green World Packaging Co., Ltd., Shanghai (CN)

(72) Inventor: Lin-da Wang, Shanghai (CN)

(73) Assignee: TOP GREEN WORLD PACKAGING CO., LTD., Shanghai (CN)

( * ) Notice: Subject to any disclaimer, the term of this patent is extended or adjusted under 35 U.S.C. 154(b) by 280 days.

(21) Appl. No.: 17/003,483

(22) Filed: Aug. 26, 2020

(65) Prior Publication Data

US 2021/0393090 A1    Dec. 23, 2021

(30) Foreign Application Priority Data

Jun. 23, 2020 (CN) .......................... 202010579165.4

(51) Int. Cl.
*A47K 10/42* (2006.01)
*B65D 75/58* (2006.01)
*B65D 83/08* (2006.01)
*A47K 10/32* (2006.01)

(52) U.S. Cl.
CPC ........ *A47K 10/421* (2013.01); *B65D 75/5894* (2013.01); *B65D 83/0811* (2013.01); *A47K 2010/3266* (2013.01); *B65D 2575/586* (2013.01)

(58) Field of Classification Search
CPC .................................................. A47K 10/421
USPC .................................................. 221/33–63
See application file for complete search history.

(56) References Cited

U.S. PATENT DOCUMENTS

| 6,554,156 B1* | 4/2003 | Chong | A47K 10/3818 221/303 |
| 2015/0048105 A1* | 2/2015 | Gordon | B65D 83/0894 221/63 |

* cited by examiner

*Primary Examiner* — Gene O Crawford
*Assistant Examiner* — Ayodeji T Ojofeitimi
(74) *Attorney, Agent, or Firm* — Muncy, Geissler, Olds & Lowe, P.C.

(57) ABSTRACT

The present invention discloses a wet wipe cover with convenient wipe drawing opening, which is used on a wet wipe packaging bag body. The wet wipe cover with convenient wipe drawing opening comprises a cover body and an upper cover, wherein the cover body is provided with a through hole in which an elastic sealing cover is arranged; and the elastic sealing cover is provided with a cutting groove from the bottom upwards, and the cutting groove does not penetrate through the upper surface of the elastic sealing cover. When the sealing cover is stressed, the elastic sealing cover bulges upwards or downwards, and a small-caliber wipe drawing opening is cracked on the upper surface of the sealing cover corresponding to the cutting groove; and when the cover is not stressed, the paper extraction opening recovers to a closed state under the action of the elastic force. When the application needs to be used, the cover is forced to open the wipe drawing opening, and the wet wipe can be ejected from the packaging bag; when it is not needed, the cover is not forced to close the wipe drawing opening, which is convenient and safe to use.

3 Claims, 3 Drawing Sheets

WET WIPE COVER WITH CONVENIENT WIPE DRAWING OPENING

TECHNICAL FIELD

The invention relates to the technical field of wet wipe packaging, in particular to a wet wipe cover with a convenient wipe drawing opening.

BACKGROUND TECHNOLOGY

In present, a wet wipe cover is arranged on the wet wipe package, a wipe drawing opening is arranged in the middle of the wet wipe cover, and the wet wipe needs to be drawn out from the wipe drawing opening when being used.

In order to facilitate users to squeeze wet wipe with their fingers, the openings of the existing wipe drawing openings are relatively large. However, this kind of large-diameter wipe drawing opening is relatively easy to pinch, but it often brings out more wet wipe, and its moisture is easy to lose and pollute.

In consideration of the above problems, the design of post-paper-drawing port is developing towards small diameter. However, it is not easy to pinch wet paper towels for small-diameter paper outlets, and other tools are often needed, which is inconvenient to use. However, it is not easy to pinch wet wipe for small-diameter wipe drawing openings, and other tools are often needed, which is inconvenient to use.

SUMMARY OF THE INVENTION

This application provides a wet wipe cover with convenient wipe drawing opening, which aims to solve the problems in the prior art that the wipe drawing opening is too large, which leads to easy loss and pollution, and the wipe drawing opening is too small, which is inconvenient for taking wet wipes.

In order to achieve the above technical purpose, the application adopts the following technical solution:

A wet wipe cover with convenient wipe drawing opening is used on a wet wipe packaging bag body and comprises a cover body and an upper cover, wherein the cover body is provided with a through hole in which an elastic sealing cover is arranged; and the elastic sealing cover is provided with a cutting groove from the bottom upwards, and the cutting groove does not penetrate through the upper surface of the elastic sealing cover. When the sealing cover is stressed, the elastic sealing cover bulges upwards or downwards, and a small-caliber wipe drawing opening is cracked on the upper surface of the sealing cover corresponding to the cutting groove; and when the cover is not stressed, the paper extraction opening recovers to a closed state under the action of the elastic force.

Preferably, the cutting groove is a cross structure, and the diameter of the formed small-caliber wipe drawing opening is 2-12 mm.

Preferably, the cover body comprises a downward concave material taking area in which a ring wall protruding from the perforation is arranged, and a convex clamping strip or a concave clamping groove is arranged on the outer side wall of the ring wall.

Preferably, the upper cover is provided with a convex sealing wall corresponding to the ring wall, and the inner side wall of the sealing wall is provided with a concave clamping groove or a convex clamping strip corresponding to the ring wall.

Due to the above-mentioned technical solution, the wet wipe cover with convenient paper taking opening can overcome the problems of easy water loss and easy pollution of the large-diameter paper taking opening and the problem of inconvenient taking and taking of the small-diameter paper taking opening by utilizing the characteristics of the elastic sealing cover; When the application needs to be used, the cover is forced to open the wipe drawing opening, and the wet wipe can be ejected from the packaging bag; when it is not needed, the cover is not forced to close the wipe drawing opening, which is convenient and safe to use.

DESCRIPTION OF PREFERRED EMBODIMENTS

The technical solution of the Utility Model will be further explained in detail through examples and with reference to the attached drawings in the following description.

The wet wipe cover with convenient wipe drawing opening is mainly used on the wet wipe packaging bag body. The wet wipe cover with convenient wipe drawing opening comprises a cover body 1 and an upper cover 2.

Figure 1:
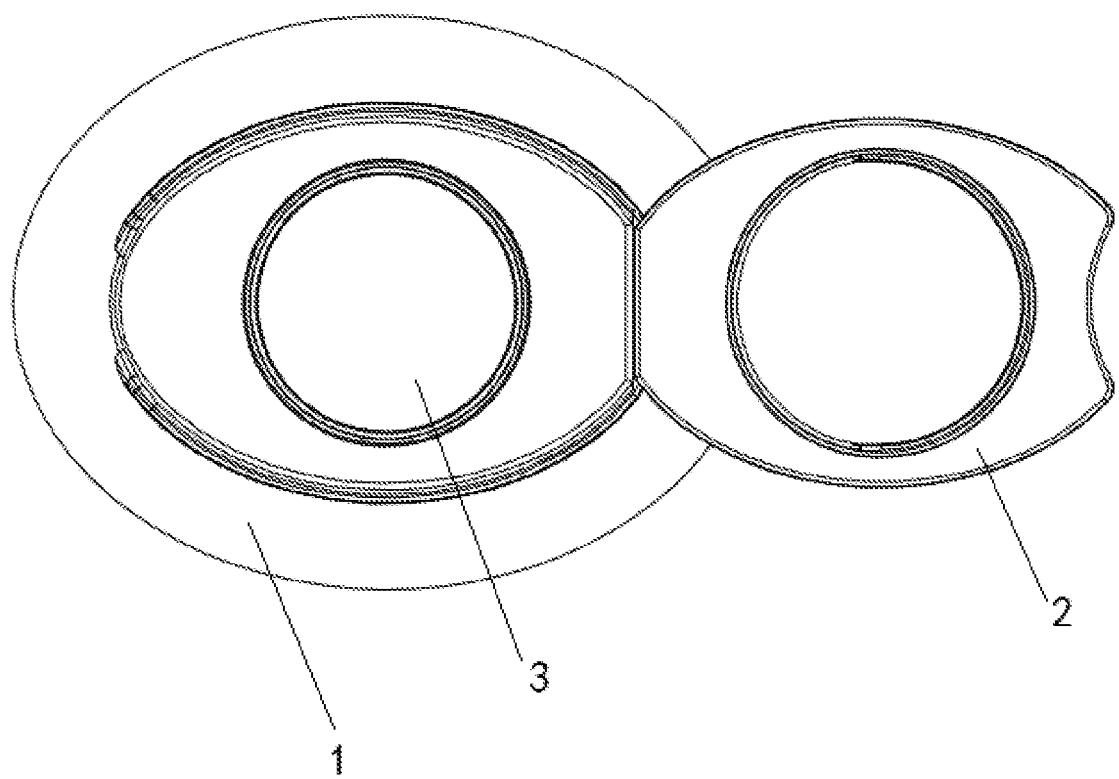
FIG. 1 is a schematic diagram of the front structure of the application.
Figure 2:
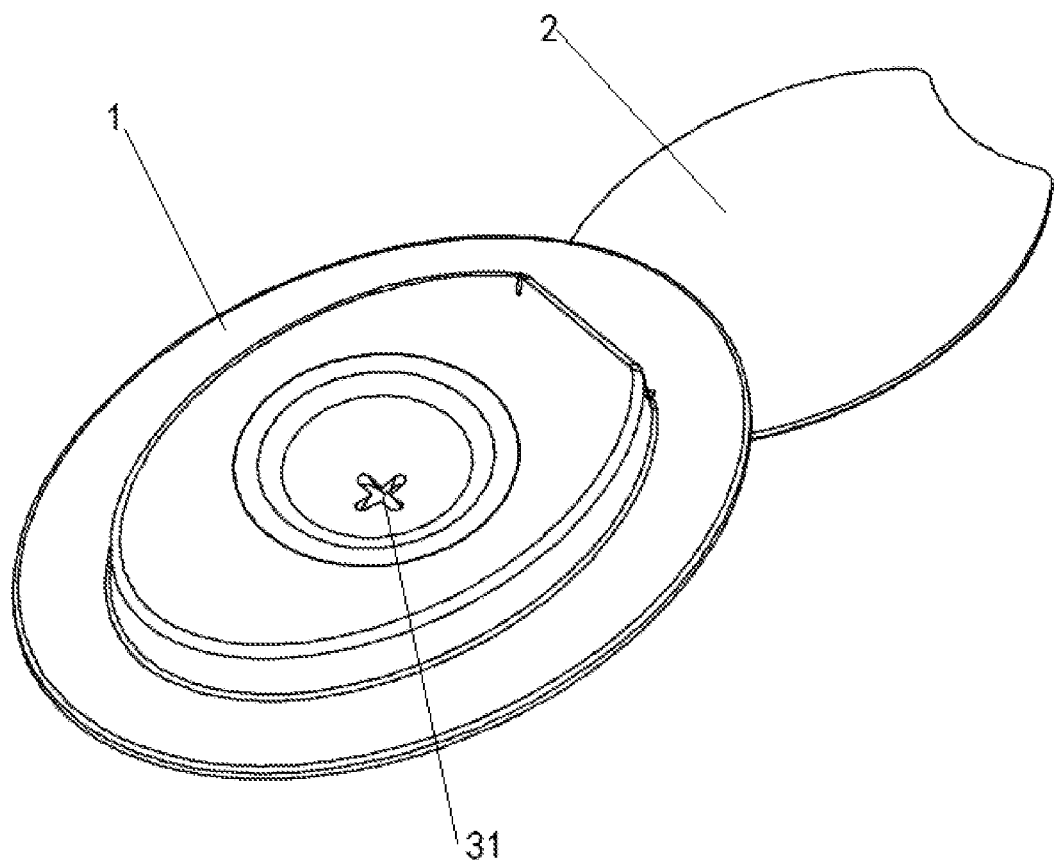
FIG. 2 is a schematic diagram of the back structure of the application.
Figure 3:
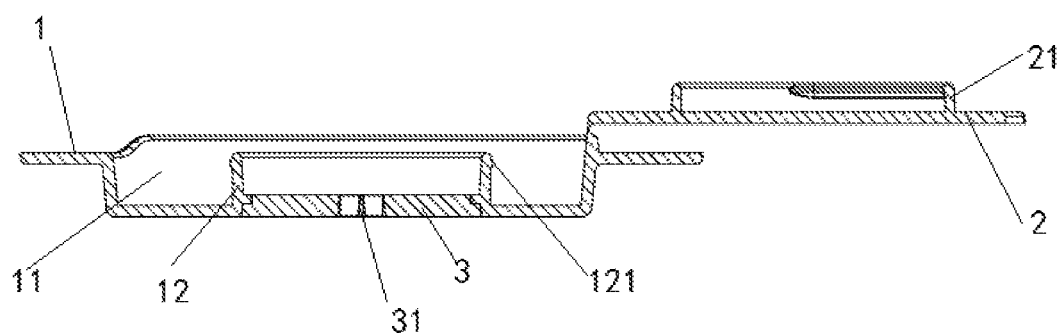
FIG. 3 is a schematic sectional view of the application.

As shown in FIG. 1 and FIG. 2, the wet wipe cover with convenient paper extraction opening in this application is provided with a through hole on the cover body 1, which is correspondingly located on the extraction reserved opening of the wet wipe packaging bag body. An elastic sealing cover 3 is arranged in the perforation. As shown in FIG. 3, the elastic sealing cover 3 is provided with a slot 31 from the bottom upward. The notch 31 does not penetrate through the upper surface of the elastic sealing cover 3. As shown in FIG. 2, the slots 31 have a cross structure.

Because the sealing cover 3 is made of elastic material, when the sealing cover 3 is forced upward or downward, the elastic sealing cover 3 correspondingly bulges upward or downward, and a small-diameter wipe drawing opening 32 is cracked on the upper surface of the sealing cover 3 corresponding to the cutting groove 31, and the diameter of the formed small-diameter wipe drawing opening is 2-12 mm. When the sealing cover 3 is not stressed, the wipe drawing opening 32 is restored to a closed state under the action of the elastic force.

Figure 4:
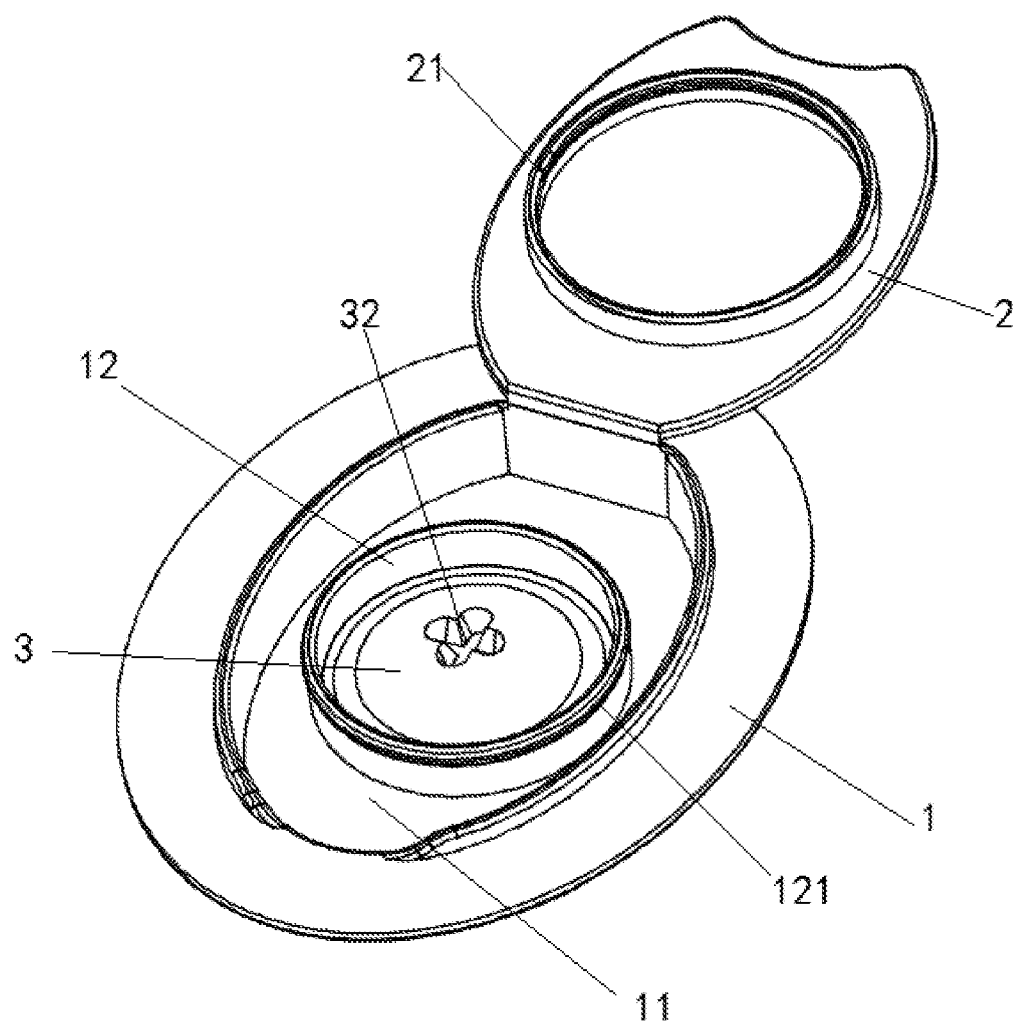
FIG. 4 is a structural schematic diagram of the application after receiving upward force.

When the wet wipe bag is not opened for use, the upper surface of the sealing cover 3 is kept in a sealed state. When it is needed to be used, downward force is applied to the sealing cover 3 with fingertips, and the sealing cover 3 will be directly broken at the position corresponding to the cutting groove 31 to form a small-diameter wipe drawing opening 32. Then apply upward force to the wet wipe bag opposite to the wipe drawing opening 32 with your fingers, and the wet wipe will be pushed out upward. The wipe drawing opening 32 protrudes upward as shown in FIG. 4, opening the wipe drawing opening. Under the action of upward force, the wet wipe will protrude from the wipe drawing opening, pinch the wet wipe, release the force and directly draw it. Due to the elasticity of the cover itself, the sealing cover 3 will shrink when it is not stressed, and then it will play a role in limiting the more wet wipe drawn out during the drawing process. After the wet wipe is extracted, the sealing cover 3 is unstressed and returns to its original closed shape.

In addition, in order to further ensure the protection of the wet wipes in the wet wipe bag in use, the cover body 1 is provided with a downward concave material taking area 11, and a ring wall 12 protruding from the perforation is arranged in the material taking area 11, and a convex clamping strip 121 (or a concave clamping groove) is arranged on the outer side wall of the ring wall 12. In addition, the upper cover 2 is provided with a convex sealing wall 21 corresponding to the ring wall 12, and a concave clamping groove (or a convex clamping strip) is provided on the inner side wall of the sealing wall 21 corresponding to the ring wall.

The above-mentioned embodiments are only used to illustrate the Utility Model and are not used to limit the scope of the Utility Model. Equal changes and modifications made to the Utility Model by those skilled in the art shall fall into the scope of the claims attached to the Utility Model.

The invention claimed is:

1. A wet wipe cover with a convenient wipe drawing opening, used on a wet wipe packaging bag body, comprising:
   a cover body; and
   an upper cover,
   wherein the cover body is provided with a through hole in which an elastic sealing cover is arranged; and the elastic sealing cover is provided with a cutting groove from a bottom, and the cutting groove does not penetrate through an upper surface of the elastic sealing cover;
   when the elastic sealing cover is stressed, the elastic sealing cover bulges upwards or downwards, and the wipe drawing opening is cracked on the upper surface of the elastic sealing cover corresponding to the cutting groove; and
   when the elastic sealing cover is not stressed, the wipe drawing opening recovers to a closed state under an action of an elastic force,
   wherein the cover body comprises a downward concave material taking area, a ring wall is disposed in the downward concave material taking area and protrudes from the elastic sealing cover, and a convex clamping strip or a concave clamping groove is arranged on an outer side wall of the ring wall.

2. The wet wipe cover with the convenient wipe drawing opening according to claim 1, wherein the cutting groove is a cross structure, and a diameter of the wipe drawing opening is 2-12 mm.

3. The wet wipe cover with the convenient wipe drawing opening according to claim 1, wherein the upper cover is provided with a convex sealing wall corresponding to the ring wall, and an inner side wall of the sealing wall is provided with a concave clamping groove or a convex clamping strip corresponding to the ring wall.

* * * * *